(12) United States Patent
Krom et al.

(10) Patent No.: US 8,842,323 B2
(45) Date of Patent: Sep. 23, 2014

(54) PRINT ENGINE FOR PRINTING A PRINT JOB USING APPROPRIATE CALIBRATION DATA

(71) Applicant: OCE Technologies B.V., Venlo (NL)

(72) Inventors: Marcus W. Krom, Eindhoven (NL); Marco H. H. Brassé, Deurne (NL)

(73) Assignee: OCE-Technologies B.V., Venlo (NL)

( * ) Notice: Subject to any disclaimer, the term of this patent is extended or adjusted under 35 U.S.C. 154(b) by 60 days.

(21) Appl. No.: 13/675,783

(22) Filed: Nov. 13, 2012

(65) Prior Publication Data

US 2013/0120776 A1   May 16, 2013

(30) Foreign Application Priority Data

Nov. 16, 2011  (EP) .................................... 11189348

(51) Int. Cl.
*G06F 3/12* (2006.01)
*G06K 15/02* (2006.01)
*H04N 1/00* (2006.01)

(52) U.S. Cl.
CPC ............ *G06K 15/02* (2013.01); *H04N 1/00031* (2013.01); *H04N 1/0005* (2013.01); *H04N 1/00063* (2013.01); *H04N 1/00045* (2013.01); *H04N 1/00076* (2013.01); *H04N 1/00482* (2013.01); *H04N 1/00047* (2013.01); *H04N 1/0009* (2013.01); *H04N 1/00474* (2013.01); *H04N 1/00411* (2013.01); *H04N 1/00015* (2013.01); *H04N 1/00023* (2013.01); *H04N 1/00087* (2013.01); *H04N 1/00424* (2013.01)
USPC ............................ 358/1.15; 358/504; 358/406

(58) Field of Classification Search
None
See application file for complete search history.

(56) References Cited

U.S. PATENT DOCUMENTS

| | | | |
|---|---|---|---|
| 6,804,025 B1 | 10/2004 | Ueda et al. | |
| 7,609,414 B2* | 10/2009 | Kumada et al. | 358/1.15 |
| 7,986,421 B2* | 7/2011 | Chen et al. | 358/1.14 |
| 8,452,201 B2* | 5/2013 | Lee | 399/66 |
| 2003/0049040 A1 | 3/2003 | Tezuka et al. | |
| 2005/0057767 A1 | 3/2005 | Toyofuku | |
| 2005/0206928 A1 | 9/2005 | Itagaki | |
| 2005/0254730 A1* | 11/2005 | Shimazaki | 382/167 |
| 2006/0114490 A1* | 6/2006 | Rolleston | 358/1.14 |
| 2006/0126106 A1* | 6/2006 | Harrington | 358/1.15 |
| 2007/0242962 A1* | 10/2007 | Yamamoto | 399/15 |
| 2008/0239400 A1 | 10/2008 | Yoshida | |
| 2009/0268261 A1 | 10/2009 | Banton et al. | |
| 2009/0279119 A1* | 11/2009 | Gerega | 358/1.15 |

FOREIGN PATENT DOCUMENTS

JP       2005-221760 A       8/2005

* cited by examiner

*Primary Examiner* — Scott A Rogers
(74) *Attorney, Agent, or Firm* — Birch, Stewart, Kolasch & Birch, LLP

(57) ABSTRACT

A print engine for producing printed output according to image data in a print job includes in its user interface an activation element for printing a part of the image data in a selected print job using currently applicable calibration data. After inspection of the printed output the selected print job may be finished without further calibration or it may be finished after a calibration is performed. This calibration of the intensity of the process colors is performed for a job control value that occurs within the selected print job. Therefore the effect of the calibration is directly visible to the user of the print engine.

14 Claims, 2 Drawing Sheets

PRINT ENGINE FOR PRINTING A PRINT JOB USING APPROPRIATE CALIBRATION DATA

FIELD OF THE INVENTION

The invention relates to a print engine for receiving and printing print jobs, a print job comprising image data and job control data, the print engine comprising a memory for saving a print job, a calibration means for keeping multiple sets of calibration data, each set of calibration data being associated with a value of the job control data, a conversion unit for converting image data in a print job to the print data using calibration data selected in accordance with the job control data in the print job, a marking process for marking image receiving material according to print data, a user interaction means for communication with a human operator, and a control unit for controlling the print engine according to the job control data and input from the user interaction means, the control unit being configured to analyse the job control data and to perform a calibration procedure to generate calibration data for a selected value of the job control data.

BACKGROUND OF THE INVENTION

Print engines receive image data to produce a printed image. If a print engine is capable of printing colour, the received image data are converted to print data for the various process colours that are used to compose the printed colour image. The conversion may comprise a rendering step, a halftoning step and a colour profiling step or a colour matching step. This last step is part of the colour management module in the conversion unit and translates the colours as defined in the image data into colours as defined in the print engine. Besides image data the print engine also receives job control data that indicate what print engine requisites are accosted in printing the image data, such as the type of receiving material, whether the material is to be printed on both sides or not, the halftone type that is involved, whether a staple is to be applied or not, etc. The control unit of the print engine analyses the job control data to determine the operation of the print engine. The job control data are received in combination with the image data in a print job. The print job may be kept in a print queue from which it is automatically printed when the print engine is prepared to do so or from which it is printed on activation by a human operator.

Colour print engines, whether they are based on inkjet technology, electrophotography or other marking processes, appear to be sensitive to environment conditions such as temperature and humidity and their reproduction of colour is not as stable as one would like. Therefore a regular calibration of the intensity or the optical density of the process colours is necessary. The usual procedure for calibration comprises the printing of a test page with a number of patches with increasing intensity for each process colour, measuring the test page with a densitometer or a scanner, and providing data based on these measurements to the calibration means of the print engine. The calibration may depend on properties or values in the job control data, such as the class of receiving material, the halftone type that is applied etc. Therefore the calibration means keeps a set of calibration data for each value of the job control data. The control unit is configured to derive from the calibration means the calibration data that are to be used in the conversion unit for converting the image data into print data in a specific print job.

Since a calibration takes time, the productivity of a print engine decreases when a calibration procedure is performed. Therefore the number of times a calibration is done is to be limited. However, the time needed to see if a calibration is necessary is usually as long as doing the calibration. Therefore the step of checking if it is necessary to calibrate is usually omitted. In United States Patent Application US 2008/0239400 it is suggested to limit the number of calibrations by the time that has passed since the last calibration has taken place. Other possible solutions include restricting the execution of a calibration to the times when replacing a component, such as toner, ink or a photoconductor, or to remotely activate a calibration, when the calibration can be done automatically. In U.S. Pat. No. 7,609,414 calibration data are provided by a remote submitter of a print job, who may also restore the original calibration data. However, these solutions do not give a human operator of a print engine a feeling of control over the behaviour of the print engine he is supervising. Moreover, the number of calibrations that must be kept by a print engine, increases due to the growing variety in materials on which the images are printed. When calibration data for a certain material become outdated, it is unclear when these data need to be updated and whether that certain material is at hand for doing a calibration. Therefore a problem exists in establishing the time and the conditions for colour calibrations in a print engine.

An object of the present invention is to give a human operator the feeling of control over the calibration frequency of a print engine that he is supervising and at the same time to limit the calibration to pertinent values of the job control data.

SUMMARY OF THE INVENTION

According to the present invention, a print engine that applies calibration data in the conversion of image data to print data, comprises user interaction means with an activation element that is configured to make, upon activation, the print engine perform the following steps: (a) converting a part of a selected print job to partial print data; (b) using the partial print data to mark image receiving material, thereby presenting a printed image for inspection to a human operator; (c) if the printed image does not satisfy requirements of the human operator, proceeding with steps (c1) to (c3), otherwise proceeding to step (d); (c1) analysing the job control data of the selected print job to establish a value of the job control data; (c2) performing a calibration procedure for the value of the job control data established in step (c1); (c3) storing the calibration data generated in step (c2) in the calibration means; and (d) printing the selected print job using the calibration data corresponding to the job control data.

The activation element is used by a human operator to start a selected print job that is sensitive to the calibration condition of the print engine. The human operator may establish if the printed image from the partial print data satisfies his requirements by e.g. comparing the printed output to a previously printed copy of the image or by inspecting critical parts of the printed image. He then decides whether a calibration is necessary to print the job in the required quality. If a calibration is needed, the job control data of the selected print job are used to select the associated calibration data that needs to be updated. An advantage of this activation element is that a fixed procedure is available to make a decision about calibration. Therefore the procedure is readily accessed and explained to novice operators. Another advantage is that a hard copy of a part of the print job is made available before and after the calibration. With this the effect of the calibration will be visible.

In a further embodiment the print engine further comprises a print queue for keeping a print job and selecting means for selecting a print job from the print queue. With this print queue the operator may influence the order in which the print jobs are printed. He may also postpone a selected print job after noticing the necessity to calibrate the print engine. He then cancels the current print job and selects another one.

In a further embodiment the print job comprises multiple pages and the partial print data is associated with one of them. This limits the amount of image data that is converted into print data and the time that is needed to make the prints with the current calibration data.

In a further embodiment the partial print data are selected from the print job in dependence on the number of differently coloured pixels in the image data. Since the calibration of the process colours aims at a predictable, constant colour rendering, it is beneficial to be able to make a decision on calibration based on as many colours as possible.

In another embodiment the partial print data are selected from the print job in dependence on an amount of pixels in the image data that indicate a colour in the vicinity of the center of the gray axis. The gray axis comprises colours from black on the one end to white on the other end. In the center of the gray axis there are various shades of gray, which are very sensitive to correct calibration. Therefore they are particularly suitable for inspecting the calibration status.

In a further embodiment wherein the user interface comprises soft-key elements that are defined by the control unit and the activation element is a soft-key element. This makes the design of the user interface very flexible and easy to update in a further release. The activation element will only be visible when the print engine is in operation.

In a further embodiment the time of the last calibration for is shown to the human operator to further inform him about the status of the calibration for a value of the job control data. This may help in the decision whether or not to calibrate for this specific value.

The print engine may be part of a print system that further comprises a job submission terminal on which a print job can be prepared. The job submission terminal comprises a job submission application or a printer driver, which is software that is compatible with the operating system running on the job submission terminal, for sending a print job to the print engine. The submission software may further comprise additional handles that are put in the job control data to select options for the processing of the job by the print engine, including indications whether or not the activation element is to be applied.

Further object, features and advantages of the method and the print system will be apparent from the more particular description of the exemplary embodiments of the print engine and the print system, as illustrated in the accompanying drawings in which like reference numbers refer to the same parts throughout the different figures. The drawings are not necessarily to scale, emphasis instead being placed upon illustrating the principle of the invention.

BRIEF DESCRIPTION OF THE DRAWINGS

Hereinafter the present invention is further elucidated with references to the appended drawings showing non-limiting embodiments and wherein.

DETAILED DESCRIPTION OF EMBODIMENTS

Figure 1:
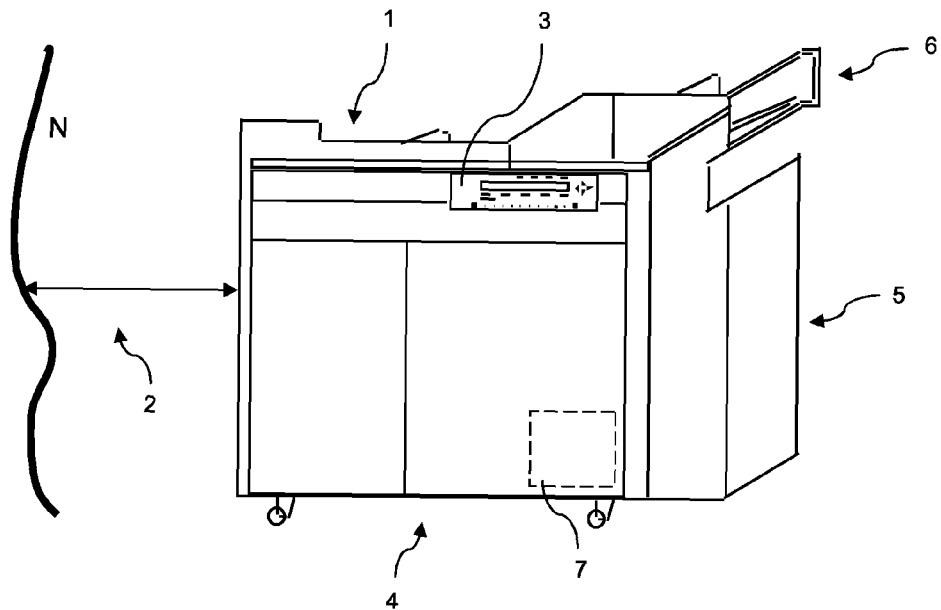
FIG. 1 is a print engine that is equipped with the invention.

FIG. 1 shows a multifunctional print engine comprising a scanner 1 with document feeder, a connection 2 to a network N wherein the arrow indicates either a wired or a wireless connection, a user interface 3, having a display to provide information to a human operator and buttons to receive information from a human operator, a colour marking process 4, a paper input module 5 comprising various drawers for different kind of cut sheet materials, and a receiving tray 6 for receiving a finished print job. A control unit 7 is configured to control the operation of the print engine.

A print job enters the print engine through the network connection 2. Another possibility to generate a print job is by scanning an original hard copy in the scanner 1. The print jobs are saved in a print queue and scheduled for printing by the control unit 7. This may be interrupted by input by a human operator through the user interface 3. This interruption may change the scheduled order of the print jobs. It is also possible to select an engine status that requires a human operator to select a print job from the print queue.

A print job comprises image data and job control data. The control unit 7 is configured to analyse the job control data and involve the appropriate resources, such as the indicated receiving material from the paper input module 5 and an associated colour output profile. Furthermore the image data are converted to print data that are suitable to be sent to the colour marking process, or printing process 4. For this conversion the control unit 7 selects appropriate calibration data from the calibration means, the calibration data being representative for the amount of marking material to be applied for occurring pixel values. The user interface 3 may show when the calibration data have been generated.

The human operator may decide whether or not a calibration is necessary for the current print job. As usual, he starts calibrating by printing a test page, measuring the obtained colour patches, which are transformed by the control unit to calibration data. However, in order to be able to decide upon calibration, the operator may need a page from the print job. Therefore he uses a distinct button on the user interface that makes the control unit select an appropriate page from the print job which is converted using the existing calibration data. If this page satisfies the human operator he will not calibrate the print engine and may continue to finish the selected print job. If the page does not satisfy the human operator he will continue by calibrating the print engine for the print job values that are present in the current print job. After calibration the selected print job is finished with the application of the newly generated calibration data.

Figure 2:
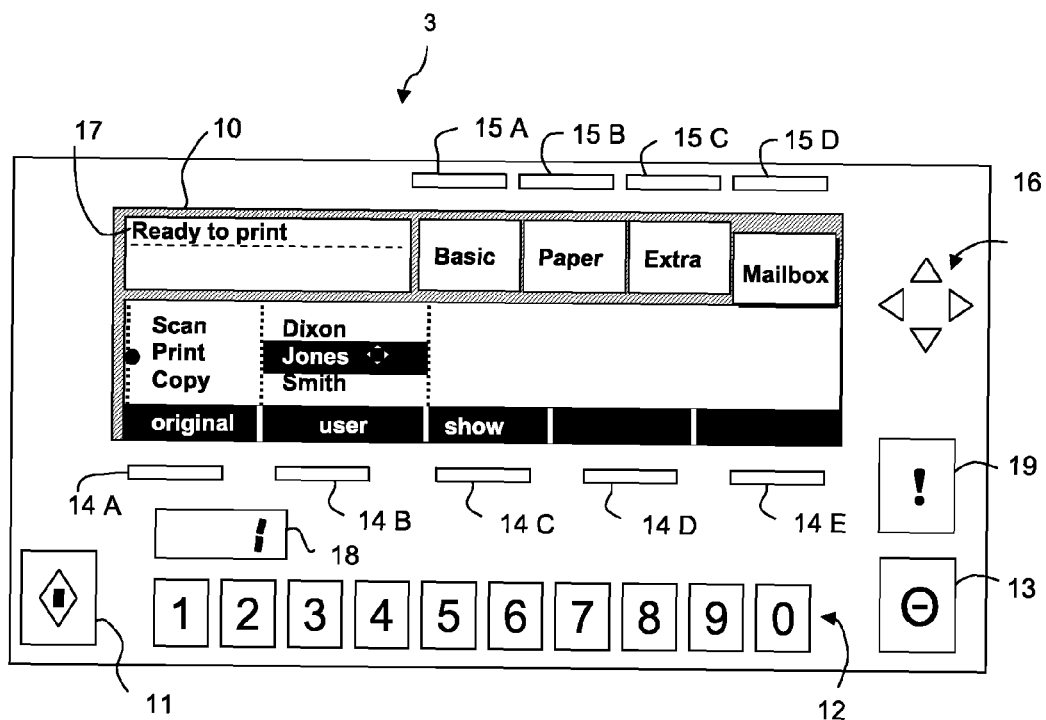
FIG. 2 is a user interface that is provided with a button according to the invention.

FIG. 2 shows a user interface according to the present invention. The user interface 3 comprises a status display 10, a start button 11, a series of numerical buttons 12, a stop button 13, a number of buttons 14A-14E to set the focus on a selection list on the status display, a number of edit buttons 15A-15D to set which job properties are to be edited, a button 16 to select from a list in focus, a status indication window 17 on the status display, a number display 18 for indicating the number of copies that is to be printed, and a try-out button 19, which is dedicated to start a calibration procedure for the selected job.

The status display 10 indicates the status of the print engine in the status indication window 17. When it is "ready to print" a print job may be selected from the print job list that is ordered according to the owner of the print job, as indicated above button 14B. If necessary, the print job properties as communicated by the job control data may be edited using the edit buttons 15A-15D to select the class of properties that is to be addressed, such as "basic" properties for setting an enlargement factor and other print quality properties, "paper" properties, such as medium selection and finishing options, etc. The start button 11 starts the print process with the present calibration data that are associated with the print job properties as received in the job control data or edited through the edit buttons. The try-out button 19 starts the control unit to select a representative page from the image data of the selected job, convert it with the present calibration data and print the page without application of the selected finishing properties, thereby presenting the page to the human operator. On the status display a selection is offered to continue to print the job without further calibration, using the start button 11, or to renew the calibration data that are used in this particular print job by using the try-out button 19 again. In the last case a test page that is available in the control unit 7 is printed and measured according to a known procedure.

Figure 3:
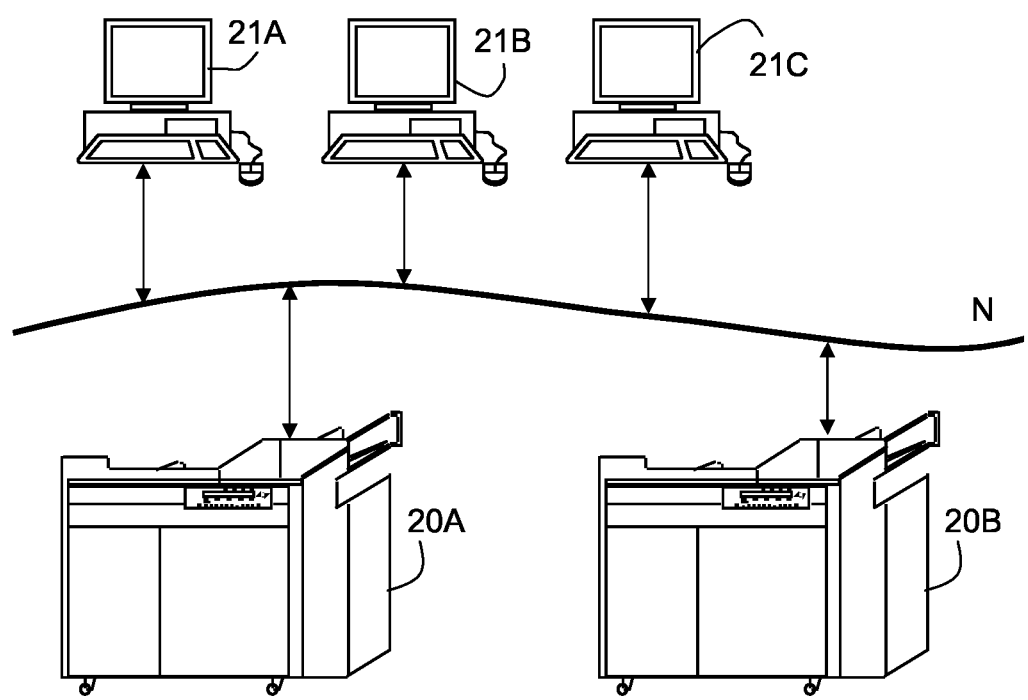
FIG. 3 is a print system comprising three job submission terminals and two print engines.

FIG. 3 shows the print engine as a part of a print system comprising three job submission terminals 21A-21C, a network N and two print engines 20A-20B. Each print engine holds his own calibration data. This means that on print engine 21A it may be necessary to calibrate if a print job is sent to this print engine, whereas it is not necessary to calibrate if the same print job is sent to print engine 21B. This may be determined by comparing a representative page, selected by the control unit based on the presence of specific colours, such as gray areas, in the image data of the print job.

The above disclosure is intended as merely exemplary, and not to limit the scope of the invention, which is to be determined by reference to the following claims.

The invention claimed is:

1. A print engine for receiving and printing print jobs, a print job comprising image data and job control data, the print engine comprising:
    a memory for saving a print job,
    a calibration device configured to keep multiple sets of calibration data, each set of calibration data being associated with a value of the job control data,
    a conversion unit for converting image data in a print job to print data using calibration data selected in accordance with the job control data in the print job,
    a marking process for marking image receiving material according to the print data,
    a user interaction device configured to communicate with a human operator, and
    a control unit for controlling the print engine according to the job control data and input from the user interaction device, the control unit being configured to analyse the job control data and to perform a calibration procedure to generate calibration data for a selected value of the job control data, wherein the user interaction device comprises an activation element that is configured to make, upon activation, the print engine perform the following steps:
    (a) converting a part of a selected print job to partial print data;
    (b) using the partial print data to mark image receiving material, thereby presenting a printed image for inspection to a human operator;
    (c) if the printed image does not satisfy requirements of the human operator, proceeding with steps (c1) to (c3), otherwise proceeding to step (d);
    (c1) analysing the job control data of the selected print job to establish a value of the job control data that is relevant for a calibration;
    (c2) performing the calibration procedure for the value of the job control data established in step (c1);
    (c3) storing the calibration data generated in step (c2) in the calibration device; and
    (d) printing the selected print job using the calibration data corresponding to the job control data.

2. A print engine according to claim 1, wherein the print engine further comprises a print queue for keeping a print job and a selecting device configured to select a print job from the print queue.

3. A print engine according to claim 1, wherein the partial print data comprise a page of a print job.

4. A print engine according to claim 3, wherein the partial print data are selected from the print job in dependence on the number of differently coloured pixels in the image data.

5. A print engine according to claim 3, wherein the partial print data are selected from the print job in dependence on an amount of pixels in the image data that indicate a colour in the vicinity of the center of the gray axis.

6. A print engine according to claim 1, wherein the user interface comprises soft-key elements that are defined by the control unit and the activation element is a soft-key element.

7. A print engine according to claim 1, wherein for each calibration to be performed an indication of the time that has lapsed since the last calibration is displayed.

8. A print system, comprising a job submission terminal and a print engine according to claim 1.

9. A print system, comprising a job submission terminal and a print engine according to claim 2.

10. A print system, comprising a job submission terminal and a print engine according to claim 3.

11. A print system, comprising a job submission terminal and a print engine according to claim 4.

12. A print system, comprising a job submission terminal and a print engine according to claim 5.

13. A print system, comprising a job submission terminal and a print engine according to claim 6.

14. A print system, comprising a job submission terminal and a print engine according to claim 7.

* * * * *